United States Patent [19]
Redden, Jr. et al.

[11] Patent Number: 6,149,694
[45] Date of Patent: Nov. 21, 2000

[54] PROCESS FOR USING ANIMAL WASTE AS FUEL

[75] Inventors: John C. Redden, Jr.; Robert E. Bush, both of Maryville; Jason W. Helton, Gallatin; James H. Teaney, Ravenwood, all of Mo.

[73] Assignee: Northwest Missouri State University, Maryville, Mo.

[21] Appl. No.: 09/334,248

[22] Filed: Jun. 16, 1999

[51] Int. Cl.[7] .................................. C10L 5/42; C05F 3/00
[52] U.S. Cl. ..................................... 44/552; 71/15; 71/21; 71/22
[58] Field of Search ................................................. 44/552

[56] References Cited

U.S. PATENT DOCUMENTS

| | | | |
|---|---|---|---|
| 4,082,532 | 4/1978 | Imhof | 71/8 |
| 4,082,859 | 4/1978 | Katzen | 426/636 |
| 4,615,711 | 10/1986 | Muller | 44/10 A |
| 4,813,996 | 3/1989 | Gardner et al. | 71/21 |
| 5,269,939 | 12/1993 | Laurent et al. | 210/705 |
| 5,431,702 | 7/1995 | Schulz | 44/552 |
| 5,730,772 | 3/1998 | Staples | 71/9 |
| 5,741,346 | 4/1998 | Glover | 71/15 |
| 5,772,721 | 6/1998 | Kazemzadeh | 71/11 |
| 5,797,972 | 8/1998 | Schulz | 44/552 |
| 5,922,262 | 7/1999 | Lagace | 264/142 |
| 5,972,058 | 10/1999 | Torkkeli | 44/552 |

*Primary Examiner*—Ellen M. McAvoy
*Attorney, Agent, or Firm*—Hovey, Williams, Timmons & Collins

[57] ABSTRACT

A fuel product derived from waste products and processes for using and forming the products are provided. Broadly, the fuel product comprises a self-sustaining body formed from a homogenous mixture including solid components derived from livestock waste (e.g., swine manure) and a second waste product different from the livestock waste (e.g., sawdust or paper). The mixture has a moisture content of from about 10–40% by weight and the formed body has a bulk density of from about 20–40 lbs/ft$^3$. The mixture or formed body is heated to a temperature of at least about 800° F. in order to produce at least about 5000 BTUs of energy per pound of mixture or body heated.

55 Claims, 2 Drawing Sheets

PYROLYSIS GAS CHROMATOGRAPHY/MASS SPECTROMETRY
VOLATILES FROM SWINE WASTE AT 300° F
TYPICAL VOLATILES OF ORGANIC ACIDS, INDOLES, SKATOLE, KETONES, ALDCHYDES, ETC.

PROCESS FOR USING ANIMAL WASTE AS FUEL

BACKGROUND OF THE INVENTION

1. Field of the Invention

The present invention is broadly concerned with fuel products formed from livestock waste and processes for making and using the fuel products. More particularly, the products are formed by blending a quantity of solid components derived from livestock waste with a second waste product different from the livestock solid waste components. Suitable livestock wastes include cattle manure, swine manure, poultry manure, and mixtures thereof while suitable second waste products include sawdust, hay or straw, paper or paper products, seasonal grasses, and mixtures of the foregoing. The blended mixture is then preferably pelletized and can be heated so as to yield high quantities of energy without emitting large quantities of pollutants.

2. Description of the Prior Art

There are large quantities of waste generated by livestock each year that must be disposed of in a safe manner. However, there are limited options for disposing of this material, particularly in hog production operations where large numbers of hogs are raised in a confined area. An extremely large quantity of hog manure is produced daily in these facilities, resulting in an often unbearable stench for those living near the facilities. Currently, these wastes are usually stored in lagoons or the like. However, lagoons and other current methods do not eliminate the odor problems associated with the livestock operations. Furthermore, current disposal/storage methods run the risk of contaminating the air, land, and water near the site.

At the same time, increasing quantities of fossil fuels are utilized each year for various things such as electricity production, heating, and transportation needs. There are continual efforts by various environmentally-minded groups to encourage the decreased consumption of fossil fuels in order to preserve the limited quantity of the fuels as well as to decrease the quantity of pollutants produced by burning the fuels. While these efforts have had some success, there is always the need for additional processes and products which utilize energy sources other than fossil fuels.

There is a need for products and processes which can utilize livestock and other wastes for producing energy. These products and processes should produce minimal quantities of pollutants while minimizing or eliminating the odor from the waste.

SUMMARY OF THE INVENTION

The instant invention fills this need by providing processes for converting livestock and other waste into energy in a manner that virtually eliminates the unappealing odor of the wastes while having a positive environmental impact. Broadly, the processes of the invention comprise mixing a quantity solid components derived from livestock waste with a second waste product different from the livestock waste.

In more detail, the livestock waste comprises excrement and other waste generated by livestock. Preferably, the livestock waste is selected from the group consisting of swine manure, cattle manure, poultry manure, and mixtures thereof. The solid components are preferably obtained by removing the liquids from the livestock waste, leaving the solid components. This can be accomplished by any conventional separations method, including a belt separator or a screening device. The liquids can then be stored in a lagoon or other area with very little odor remaining in the liquids. The moisture content of the solid components remaining after liquid removal will generally be from about 60–80% by weight, based upon the total weight of the solid components taken as 100% by weight.

The second waste product can be most any waste product including industrial and agricultural wastes, with sawdust, seasonal grasses (e.g., switchgrass), straw, paper or paper products, seed cleanings, municipal solid waste (e.g., paper, paperboard, food waste), and mixtures thereof being particularly preferred. Generally, the main requirement for selecting the second waste product is that it have a lower moisture content than that of the solid components to be utilized.

In the processes for forming the fuel products of the invention, the solid components derived from the livestock waste are blended with the second waste product so as to form a substantially homogenous mixture of the waste products. Preferably the weight ratio of the livestock waste solid components to the second waste product is from about 15:85 to about 60:40, and more preferably from about 20:80 to about 50:50. The weight ratios are adjusted as necessary to achieve a blended mixture having a moisture content of from about 10–40% by weight, and preferably from about 30–40% by weight, based upon the total weight of the mixture taken as 100% by weight.

Advantageously, these moisture contents are obtained solely by the selection of the various waste products and by adjusting the ratios of the waste products. Therefore, there is no need to subject any of the components to any drying processes (e.g., fluidized bed dryers) in order to achieve these moisture levels. This eliminates the expense and energy consumption associated with mechanical drying processes. Thus, because the mixing of the waste products is preferably carried out in the temperature of the particular environment wherein the mixing is taking place, the temperature of the air to which the components are subjected during processing is less than about 100° F. preferably less than about 85° F., and more preferably less than about 75° F., with this number depending on the weather or plant conditions where the process is conducted.

Furthermore, there is no need to allow the livestock waste to dry in ambient air until the desired moisture levels are obtained, creating an odor nuisance in the areas near the waste. The livestock waste can be processed immediately with minimal energy requirements.

While the blended mixture can be heated and used as fuel without further processing, it is preferred that the mixture be formed into a self-sustaining body such as a pellet. This allows for easier handling of the product and further permits improved air circulation through the product during heating. The bodies can be formed by any known equipment, including a conventional pelletizer. In most applications, it is preferred that the largest average surface-to-surface dimension of the self-sustaining bodies be less than about 0.50 inches, and more preferably from about 0.25–0.4 inches. The bulk density (as opposed to actual density) of the bodies is from about 20–40 lbs/ft$^3$, and preferably from about 30–35 lbs/ft$^3$.

In most instances, the second waste product will need to be subjected to a size reduction process (e.g., by passing the second waste product through a hammermill) prior to mixing with the livestock waste solid components so that the average particle size of the second waste product is less than about 1.5 times, and preferably less than about 1.1 times, the largest average surface-to-surface dimension of the final self-sustaining body. This particle size allows for a more uniform blending of the various waste products and also minimizes the amount of work that would need to be done by the pelletizer or other apparatus. For example, if the largest average surface-to-surface dimension of the final pellet is 0.5 inches, the average particle size of the second waste product should be less than about 0.75 inches, and preferably less than about 0.55 inches.

If necessary, the particle size of the livestock waste solid components can likewise be reduced so as to yield sizes similar to those discussed above with respect to the second waste product. Alternately, the particle size of the mixture of the solid components and second waste product can be reduced.

In use, the formed mixture or self-sustaining body generates energy when heated. The mixture or body should be heated to a temperature of at least about 800° F., preferably at least about 1000° F., and more preferably at least about 1400° F. Conventional gasifiers and combustion boilers are just two examples of devices which can be used to heat or combust the inventive mixtures or bodies for use as fuel. Those skilled in the art will appreciate that any device capable of achieving the aforementioned temperatures are suitable for use in the instant invention.

During the heating step, at least about 5000 BTUs, and preferably at least about 8000 BTUs of energy will be generated per pound of the mixture or body that is heated. Furthermore, the odor from the waste is substantially reduced, and in most cases nearly undetectable in both the inventive mixture or body itself, as well as in the emissions generated from heating the product.

In practicing the invention as described above (i.e., both preparation of the product and use of the product), equipment commonly used in the art can be utilized during the various stages. Thus, any conventional grinders, mixers, etc. are suitable for use in the instant invention. A preferred hammermill for particle size reduction is the Bliss E192-TF #4926 with an air assist package. A preferred pellet mill is California Pellet Mill 201. Of course, those skilled in the art will readily appreciate that the equipment can be altered among comparable models. Furthermore, large capacity units can be substituted when these processes are conducted on a large scale basis.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Example 1

1. Materials and Methods

In the following tests a Finnigan-MAT TSQ-700 Mass Spectrometer, Varian 3400 Gas Chromatograph, and a 120 Pyroprobe Pyrolysis Unit were utilized for the respective tests. The mass spectrometer conditions were: scan range (m/z)—20 to 300 at 0.5 seconds per scan at 70 eV ionization voltage with positive electron ionization. The gas chromatograph temperature program was: initial temperature—10° C.; temperature program rate—20° C./min. to the final temperature of 250° C.; and final temperature was held for 40 minutes. The pyrolysis conditions were: interface at 200° C.; and temperature ramping at 20° C./ms, over an interval of 5 seconds at various set temperatures.

2. Pyrolysis and GC/MS Analyses of Hog Waste

Figure 1:
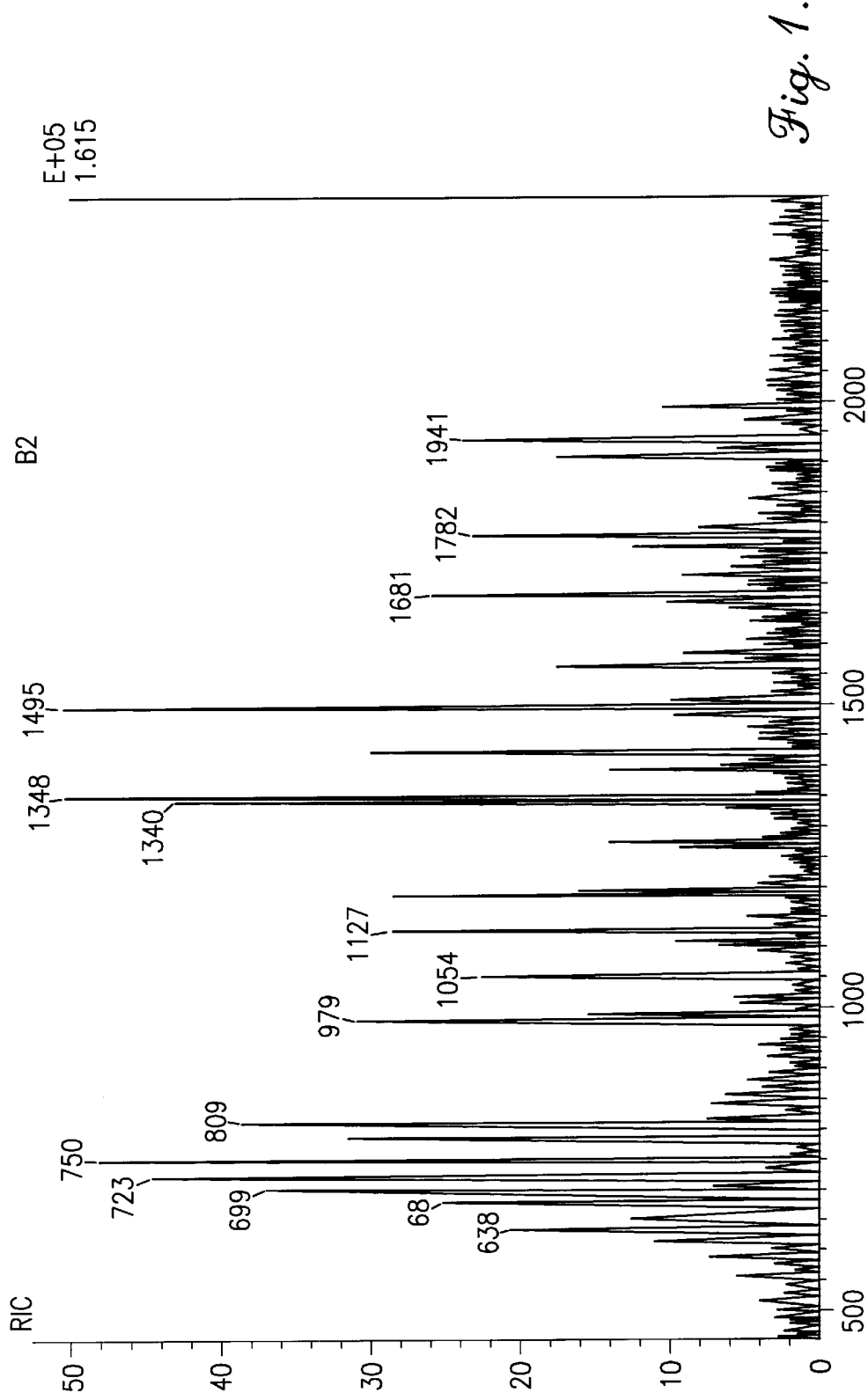
FIG. 1 depicts the gas chromatography/mass spectrometry results from a hog waste sample after pyrolyzing at to 300° F.

Samples of hog waste were analyzed by GC/MS equipment after pyrolysis at 300° F., 600° F., 1000° F., and 1500° F. Total Chromatograms from the mass specta were recorded for each analysis. There were more than 45 peaks and compounds in the total chromatogram of the sample pyrolyzed at 300° F. (See FIG. 1). These compounds consisted of a series of low molecular weight acids beginning with acetic acids, a series of fatty acids, a series of fatty acid esters, indoles, skatole, various ketones, aldehydes, and sulfur compounds (including methanethiol and sulfur dioxide). The compounds responsible for the odor in the waste include organic acids and esters (acetic through hexanoic), aldehydes, ketones, indoles, skatole, phenols, ammonia, and organic sulfur and nitrogen compounds.

The sample that had been pyrolyzed at 300° F. was then pyrolyzed at 600° F. for further analysis. The total chromatogram showed fewer compounds for this second heating stage. The low molecular weight fatty acids were gone as were other low molecular weight compounds. The higher molecular weight compounds (e.g., the fatty acids and esters) were more pronounced. The pyrolysis of the same sample at 900° F. showed only a very few peaks (only fatty acid esters), remained with most of the odor-producing compounds being eliminated. This sample (which was located in a quartz tube) was visually inspected after the three heatings. A charred residue remained in the tube. The sample was returned to the pyrolysis unit and analyzed after pyrolysis at 1500° F. Compounds still exhibiting peaks included phenols, methylphenols, dimethylphenols, and alkenes and alkanes (C12 to C18). The compounds responsible for the odors associated with the hog waste had been completely removed before the pyrolysis at 1500° F. In conclusion, most of the objectionable odor-producing compounds can be thermally removed by heating the waste to a temperature of 600 to 900° F. Complete removal of organic compounds would require heating the wastes to a temperature of about 1500 to 2000° F. At these temperatures all organic compounds were converted to typical combustion gases.

Example 2

Analyzation of Stack Emissions

Figure 2:
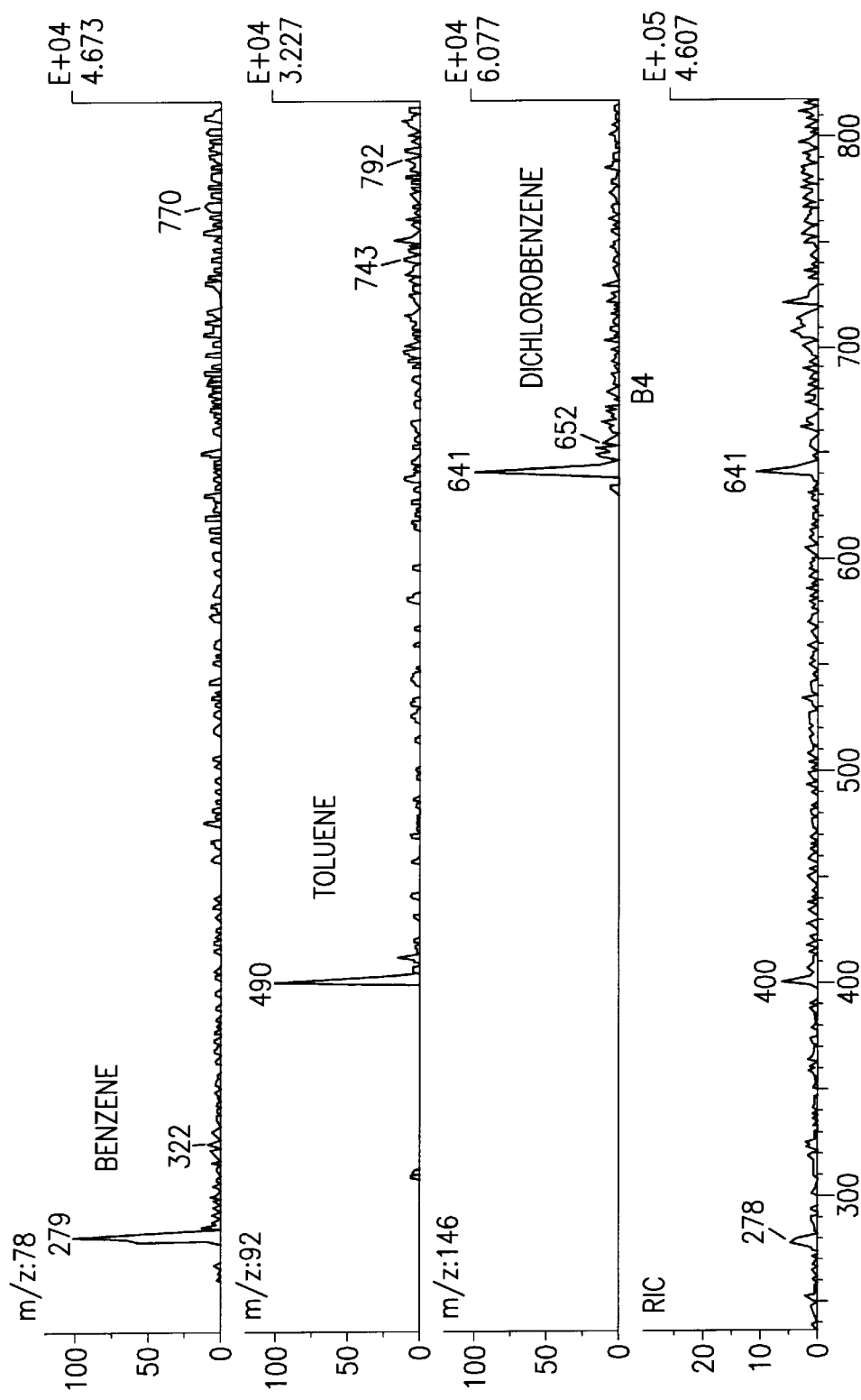
FIG. 2 depicts the mass spectrometry results of a stack sample taken during burning of an inventive pellet.

Hog waste was screened so as to separate the solid components of the waste from the liquid portion. The solid components had an approximate moisture content of 70% by weight, based upon the total weight of the solid components taken as 100% by weight. Orchard grass was ground in a New Holland Grinder/Mixer so that the average particle size of the grass was less than about 0.75 inches. The ground grass was then mixed with the solid components at a weight ratio of solid components:orchard grass of 20:80 until the mixture was substantially homogenous. The mixture was pelletized in a California Pellet Mill Master Model 30 HP to a pellet size of about 5/16 inch. A quantity of pellets were then pyrolyzed at a temperature of approximately 1300° F. A quantity of the emissions was collected on a charcoal tube by pumping one liter of the emissions per minute for 20 minutes. The emissions sample was analyzed by desorption of the emissions into a GC/MS (tests conditions and equipment parameters were as described above). A quantity of pure (i.e., no hog waste) orchard grass was then pyrolyzed at the same temperature and tested as described above with respect to the hog waste/orchard grass pellet for purposes of comparison. The carbon, hydrogen, and nitrogen in the samples is reported in Table 1. FIG. 2 shows the mass spectra of the hog waste/orchard grass pellet. While trace organic compounds were still present in the hog waste/orchard grass after heating, the odor-causing compounds were not present in the emissions.

TABLE 1

% by Weight[a] of Carbon, Hydrogen, and Nitrogen Present in Stack Emissions

|  | Test Run 1 | Test Run 2 | Test Run 3 | Test Run 4 | Avg. of 4 Analyses | Std Dev |
|---|---|---|---|---|---|---|
| Orchard Grass |  |  |  |  |  |  |
| Carbon | 41.27 | 41.20 | 40.90 | 41.02 | 41.10 | 0.17 |
| Hydrogen | 5.78 | 5.70 | 5.71 | 5.67 | 5.72 | 0.05 |
| Nitrogen | 1.68 | 1.54 | 1.39 | 1.53 | 1.54 | 0.12 |
| Orchard Grass/Hog Waste |  |  |  |  |  |  |
| Carbon | 39.18 | 36.18 | 34.78 | 33.64 | 35.95 | 2.39 |
| Hydrogen | 5.49 | 5.10 | 4.88 | 4.78 | 5.06 | 0.31 |
| Nitrogen | 1.65 | 1.63 | 1.37 | 1.41 | 1.52 | 0.15 |

[a]Based upon total weight of stack sample taken as 100% by weight.

Example 3

Determination of BTUs and Moisture Contents of Various Samples

The moisture contents and energy values of various samples were determined using the following equipment: LECO AC-350 Automatic Calorimeter; Computrac Max 50 Moisture Analyzer; and LECO CHN-800 Micro-Carbon-Hydrogen-Nitrogen Determinator. Following the Isoperibol Jacket Method, the calorific values (BTU content, BTU/lb) of the samples were determined by burning to ash a known quantity of the particular sample. The heat released by combustion is proportional to the calorific value of the substance. The samples included pelletized orchard grass with lime and pellets containing a weight ratio of hog waste:orchard grass of 30:70 and prepared as described in the previous examples. The moisture contents and BTUs of the samples are reported in Tables 2 and 3, respectively.

TABLE 2

% by Weight Moisture of Samples

|  | % moisture[a] |
|---|---|
| Pelletized orchard grass with lime | 7.21 |
|  | 7.20 |
|  | 7.18 |
|  | 7.16 |
| AVERAGE | 7.19 |
| Hog waste:orchard grass pellets (30:70 weight ratio) | 26.87 |
|  | 26.40 |
|  | 26.59 |

TABLE 2-continued

% by Weight Moisture of Samples

|  | % moisture[a] |
|---|---|
|  | 26.95 |
|  | 25.64 |
| AVERAGE | 26.29 |

[a]Based upon total weight of stack sample taken as 100% by weight.

TABLE 3

|  | BTUs[a] |
|---|---|
| Pelletized orchard grass | 7236 |
|  | 7248 |
|  | 7259 |
| AVERAGE | 7248 |
| 30/70 hog waste orchard grass | 5644 |
|  | 5675 |
|  | 5669 |
| AVERAGE | 5663 |

[a]BTUs per pound of sample heated.

Additional pellets were prepared having various weight ratios of livestock waste to second waste product, as well as comparison samples of pure livestock waste or pure second waste product (i.e., sawdust, paper, seasonal grasses). The BTUs of the samples and in some instances the carbon, hydrogen, and nitrogen contents of the stack emissions were determined as described above. This data is reported in Table 4.

TABLE 4

| Sample | BTUs[a] | % Moisture[b] Content | Wt. %[c] Carbon | Wt. %[c] Hydrogen | Wt. %[c] Nitrogen |
|---|---|---|---|---|---|
| Switchgrass Pellets | 7860 | 8.6 | N/D[d] | N/D | N/D |
| Ground Switchgrass | 7117 | 11.73 | N/D | N/D | N/D |
| Sawdust | 7160 | 11.26 | N/D | N/D | N/D |
| Chicken Litter | 5628 | N/D | N/D | N/D | N/D |
| Paper Pellets | 5891 | 15.07 | 40.38 | 5.50 | 0.11 |
| Fresh Hog Manure | 1969 | 76.92 | N/D | N/D | N/D |
| Hog waste: Switchgrass Pellets (35:65) | 5928 | 11.59 | 33.02 | 4.48 | 0.92 |
| Hog waste: Sawdust Pellets (40:60) | 6306 | 9.75 | 35.21 | 4.65 | 2.20 |

[a]BTUs per pound of sample heated.
[b]Based upon total weight of sample taken as 100% by weight.
[c]Based upon total weight of stack emissions taken as 100% by weight.
[d]N/D represents "Not Determined."

We claim:

1. A process for forming a fuel product from livestock waste comprising the steps of:
   (a) forming a mixture comprising a quantity of solid components derived from the livestock waste and a second waste product different from said livestock waste, said solid components having a moisture content prior to said forming step, and said formed mixture having a moisture content lower than said solid components moisture content; and
   (b) forming the mixture resulting from step (a) into a self-sustaining body having a bulk density of from about 20–40 lbs/ft$^3$.

2. The process of claim 1, wherein said livestock waste is selected from the group consisting of swine manure, cattle manure, poultry manure, and mixtures thereof.

3. The process of claim 1, wherein said waste product is selected from the group consisting of sawdust, seasonal grasses, straw, paper, seed cleanings, municipal solid wastes, and mixtures thereof.

4. The process of claim 1, wherein said livestock waste comprises an aqueous portion and further including the step of separating said aqueous portion from said livestock waste so as to yield said solid components, said separating step being carried out prior to step (a).

5. The process of claim 4, wherein said separating step comprises screening said livestock waste with a screening device so as to retain at least some of said solid components present in said waste on said device while allowing the majority of said aqueous portion to pass through said screening device.

6. The process of claim 1, wherein said solid component moisture content is from about 60–80% by weight, based upon the total weight of the solid components taken as 100% by weight.

7. The process of claim 1, wherein said formed mixture moisture content is from about 10–40% by weight, based upon the total weight of the formed mixture taken as 100% by weight.

8. The process of claim 1, wherein the weight ratio of said livestock waste solid components to said second waste product is from about 15:85 to about 60:40.

9. The process of claim 1, wherein said solid component moisture content and said formed mixture moisture content are obtained without subjecting said solid components or said formed mixture to a drying step.

10. The process of claim 1, wherein the temperature of the air in which step (a) is carried out is less than about 100° F.

11. The process of claim 1, further including the step of reducing the particle size of said second waste product prior to step (a).

12. The process of claim 11, wherein said reducing step comprises passing said second waste product through a hammermill.

13. The process of claim 11, wherein the average particle size of said second waste product after said reducing step is less than about 0.75 inches.

14. The process of claim 1, wherein said forming step (b) comprises pelletizing said mixture so as to yield a pellet.

15. The process of claim 14, wherein the largest average surface-to-surface dimension of said pellet is less than about 0.50 inches.

16. The process of claim 14, further including the step of reducing the particle size of said second waste product so that the average particle size of said second waste product is less than about 1.5 times the largest average surface-to-surface dimension of said pellet.

17. The process of claim 1, further including the step of heating said self-sustaining body to a temperature of at least about 800° F.

18. The process of claim 17, wherein said heating step is carried out in a gasifier.

19. The process of claim 17, wherein said heating step produces at least about 5000 BTUs of energy per pound of self-sustaining body heated.

20. The process of claim 1, further including the step of reducing the particle size of the mixture formed in step (a) prior to said forming step (b).

21. The process of claim 20, wherein the average particle size of said solid components and said second waste product in said mixture is less than about 0.75 inches.

22. A fuel product according to claim 1.

23. A process of using a fuel product to produce energy, said process comprising the steps of:
(a) providing a blended mixture comprising a quantity of solid components derived from livestock waste and a second waste product different from said livestock waste, said solid components having a moisture content of from about 60–80% by weight based upon the total weight of the solid components taken as 100% by weight, and said formed mixture having a moisture content of from about 10–40% by weight based upon the total weight of the formed mixture taken as 100% by weight; and
(b) heating said blended mixture to a temperature of at least about 800° F.

24. The process of claim 23, wherein said heating step is carried out in a gasifier.

25. The process of claim 23, wherein said heating step produces at least about 5000 BTUs of energy per pound of said mixture heated.

26. The process of claim 23, wherein said livestock waste is selected from the group consisting of swine manure, cattle manure, poultry manure, and mixtures thereof.

27. The process of claim 23, wherein said second waste product is selected from the group consisting of sawdust, seasonal grasses, straw, paper, seed cleanings, municipal solid wastes, and mixtures thereof.

28. The process of claim 23, wherein said livestock waste comprises an aqueous portion and further including the step of separating said aqueous portion from said livestock waste so as to yield said solid components, said separating step being carried out prior to step (a).

29. The process of claim 28, wherein said separating step comprises screening said livestock waste with a screening device so as to retain at least some of said solid components present in said waste on said device while allowing the majority of said aqueous portion to pass through said device.

30. The process of claim 23, wherein the weight ratio of said livestock waste solid components to said second waste product is from about 15:85 to about 60:40.

31. The process of claim 23, wherein said solid component moisture content and said formed mixture moisture content are obtained without subjecting said solid components or said formed mixture to a drying step.

32. The process of claim 23, wherein the temperature of the air in which step (a) is carried out is less than about 100° F.

33. The process of claim 23, further including the step of reducing the particle size of said second waste product prior to step (a).

34. The process of claim 33, wherein said reducing step comprises passing said second waste product through a hammermill.

35. The process of claim 33, wherein the average particle size of said second waste product after said reducing step is less than about 0.75 inches.

36. The process of claim 23, further including the step of reducing the particle size of the mixture formed in step (a) prior to said heating step (b).

37. The process of claim 36, wherein the average particle size of said solid components and said second waste product in said mixture is less than about 0.75 inches.

38. The process of claim 23, wherein said blended mixture is in the form of a self-sustaining body.

39. The process of claim 38, wherein said self-sustaining body has a bulk density of from about 20–40 lbs/ft$^3$.

40. A process of using a fuel product to produce energy, said process comprising the steps of:

(a) providing a blended mixture comprising a quantity of solid components derived from livestock waste and a second waste product different from said livestock waste, said second waste product having an average particle size of less than about 0.75 inches; and (b) heating said blended mixture to a temperature of at least about 800° F.

41. The process of claim 40, wherein said livestock waste is selected from the group consisting of swine manure, cattle manure, poultry manure, and mixtures thereof.

42. The process of claim 40, wherein said waste product is selected from the group consisting of sawdust, seasonal grasses, straw, paper, seed cleanings, municipal solid wastes, and mixtures thereof.

43. The process of claim 40, wherein said livestock waste comprises an aqueous portion and further including the step of separating said aqueous portion from said livestock waste so as to yield said solid components, said separating step being carried out prior to step (a).

44. The process of claim 43, wherein said separating step comprises screening said livestock waste with a screening device so as to retain at least some of said solid components present in said waste on said device while allowing the majority of said aqueous portion to pass through said device.

45. The process of claim 40, wherein the weight ratio of said livestock waste solid components to said second waste product is from about 15:85 to about 60:40.

46. The process of claim 40, wherein said blended mixture is in the form of a self-sustaining body.

47. The process of claim 46, wherein said self-sustaining body has a bulk density of from about 20–40 lbs/ft$^3$.

48. A fuel product comprising a self-sustaining body comprising a blended mixture including solid components derived from livestock waste and a second waste product different from said livestock waste, said solid components having a moisture content and said blended mixture having a moisture content lower than said solid component moisture content, said body having a bulk density of from about 20–40 lbs/ft$^3$.

49. The product of claim 48, wherein said blended mixture moisture content is from about 10–40% by weight, based upon the total weight of the mixture taken as 100% by weight.

50. The product of claim 48, wherein said livestock waste is selected from the group consisting of swine manure, cattle manure, poultry manure, and mixtures thereof.

51. The product of claim 48, wherein said second waste product is selected from the group consisting of sawdust, seasonal grasses, straw, paper, seed cleanings, municipal solid wastes, and mixtures thereof.

52. The product of claim 48, wherein said solid component moisture content is from about 60–80% by weight, based upon the total weight of the solid components taken as 100% by weight.

53. The product of claim 48, wherein the weight ratio in said blended mixture of said livestock waste solid components to said second waste product is from about 15:85 to about 60:40.

54. The product of claim 44, wherein the largest average surface-to-surface dimension of said body is less than about 0.50 inches.

55. The product of claim 44, wherein the average particle size of said second waste product is less than about 0.75 inches.

* * * * *